United States Patent
Jokisch

(10) Patent No.: US 8,721,241 B2
(45) Date of Patent: May 13, 2014

(54) SELF-TAPPING BLIND RIVET

(75) Inventor: Matthias Jokisch, Langenhagen (DE)

(73) Assignee: Avdel UK Limited, Welwyn Garden, Hertfordshire (GB)

( * ) Notice: Subject to any disclaimer, the term of this patent is extended or adjusted under 35 U.S.C. 154(b) by 0 days.

(21) Appl. No.: 13/449,699

(22) Filed: Apr. 18, 2012

(65) Prior Publication Data

US 2012/0219383 A1 Aug. 30, 2012

Related U.S. Application Data

(62) Division of application No. 12/377,346, filed as application No. PCT/DE2007/001486 on Aug. 22, 2007, now abandoned.

(30) Foreign Application Priority Data

Aug. 26, 2006 (DE) ..................... 20 2006 013 142 U

(51) Int. Cl.
*F16B 19/10* (2006.01)
*F16B 19/08* (2006.01)
*F16B 5/04* (2006.01)

(52) U.S. Cl.
CPC ............. *F16B 19/086* (2013.01); *F16B 19/083* (2013.01); *F16B 19/1054* (2013.01); *F16B 5/04* (2013.01)
USPC .............................................. 411/29; 411/43

(58) Field of Classification Search
USPC ................................ 411/29, 34, 43
See application file for complete search history.

(56) References Cited

U.S. PATENT DOCUMENTS

| 2,038,189 | A | * | 4/1936 | Morris ....................... 72/370.01 |
| 3,247,754 | A | | 4/1966 | Bieser |
| 3,426,375 | A | | 2/1969 | Jeal |
| 3,750,518 | A | | 8/1973 | Rayburn |
| 3,935,786 | A | | 2/1976 | Murray |
| 4,036,098 | A | * | 7/1977 | Schruff ........................... 411/34 |
| 4,736,560 | A | | 4/1988 | Murphy |
| 5,234,301 | A | | 8/1993 | Grossberndt et al. |
| 5,344,267 | A | * | 9/1994 | Stenberg et al. ................. 411/29 |
| 5,383,753 | A | * | 1/1995 | Palm ............................. 411/29 |

(Continued)

FOREIGN PATENT DOCUMENTS

| DE | 3909725 | 9/1990 |
| DE | 3922684 | 1/1991 |

(Continued)

OTHER PUBLICATIONS

English translation of DE 3909725.

(Continued)

*Primary Examiner* — Flemming Saether
(74) *Attorney, Agent, or Firm* — Hahn, Loeser & Parks LLP; Arland T. Stein

(57) ABSTRACT

Self-tapping blind rivet (10) having a mandrel (12) carrying a hole-forming tip (16) at its end facing the workpiece, wherein the tip (16) is performed as an apparatus for drilling the rivet's own placing hole, wherein a positive or non-positive connection is provided between the mandrel (12) of the rivet and the rivet shank (18) and, wherein a force application point (26) for a tool is provided at or in the rivet head (20), and a method for placing such a blind rivet.

8 Claims, 4 Drawing Sheets

(56) References Cited

U.S. PATENT DOCUMENTS

| | | | |
|---|---|---|---|
| 5,618,142 | A | 4/1997 | Sonden et al. |
| 6,224,310 | B1 | 5/2001 | Summerlin et al. |
| 6,398,472 | B1 * | 6/2002 | Jones ............................ 411/34 |
| 6,834,420 | B1 * | 12/2004 | Rothe et al. .............. 29/243.526 |
| 7,296,499 | B2 | 11/2007 | Bodin et al. |
| 7,322,783 | B2 | 1/2008 | Pearce et al. |
| 7,862,271 | B2 * | 1/2011 | Wang et al. .................... 411/34 |
| 2006/0024145 | A1 | 2/2006 | Wang et al. |
| 2006/0236739 | A1 * | 10/2006 | Smith et al. ....................... 72/67 |
| 2010/0232907 | A1 | 9/2010 | Jokisch |

FOREIGN PATENT DOCUMENTS

| | | |
|---|---|---|
| DE | 4440437 | 2/1996 |
| DE | 102005035402 | 3/2006 |
| DE | 102004049045 | 4/2006 |
| DE | 202006013142.6 | 8/2006 |
| EP | 1503089 | 2/2005 |
| JP | H02-091212 | 7/1990 |
| WO | 94/00701 | 1/1994 |
| WO | 2004/102015 | 11/2004 |
| WO | 2008/025327 | 6/2008 |

OTHER PUBLICATIONS

English translation of DE 3922684.
English translation of DE 4440437.
English translation of DE 102005035402.
English translation of EP 1503089.
English translation of the International Preliminary Report on Patentability which issued in connection with International Application PCT/DE2007/001486.
Search report issued by the German Patent and Trademark Office in connection with German application DE 202006013142.6, dated Nov. 16, 2006.
International Search Report for International Application PCT/DE2007/001486, dated Feb. 21, 2008.

* cited by examiner

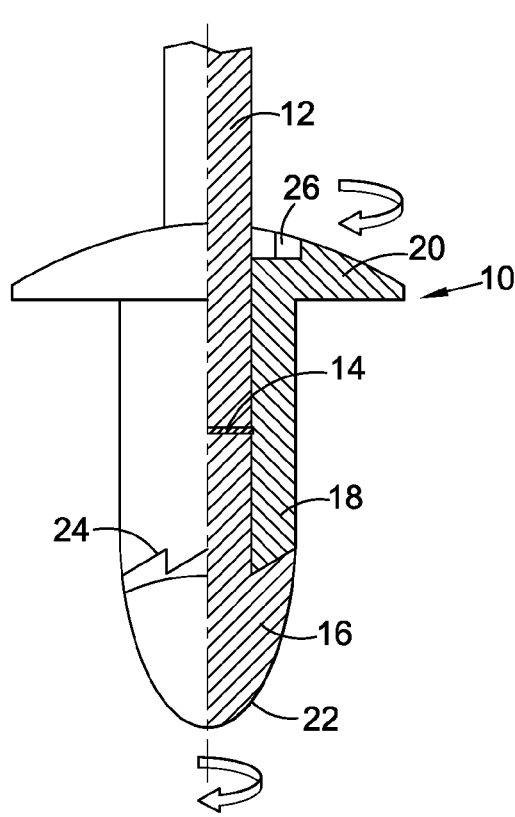
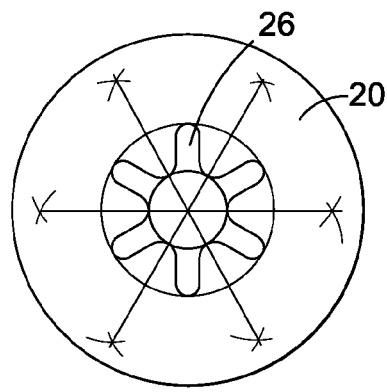
Fig.2
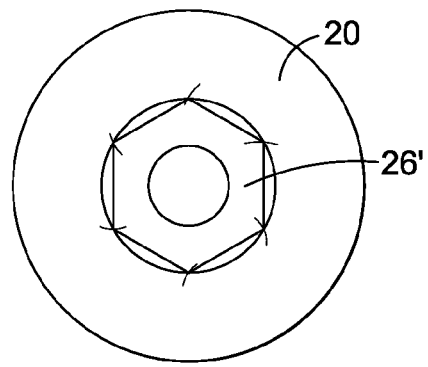
Fig.3
Fig.1
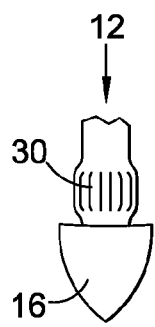 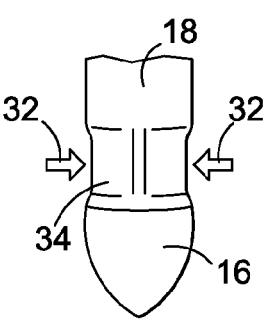 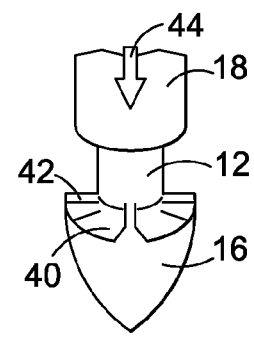
Fig.4a   Fig.4b   Fig.5

SELF-TAPPING BLIND RIVET

CROSS-REFERENCE TO RELATED APPLICATIONS

This application is a divisional of U.S. application Ser. No. 12/377,346, filed Apr. 9, 2009, which is a national stage of International Application No. PCT/DE2007/001486, filed Aug. 22, 2007, and claims priority to German Application No. 202006013142.6, filed Aug. 26, 2006.

BACKGROUND AND SUMMARY

The present invention relates to a self-drilling blind rivet having a mandrel which at the end thereof facing the workpiece is having a hole-forming tip as well as a method for placing such a blind rivet.

Such self-drilling blind rivets already are known from the prior art. There the tip of the pulling head of the mandrel of the blind rivet on the side of the workpiece is performed as a drilling tool for drilling a hole in the workpiece. The corresponding rotary drive is performed via the mandrel which is provided on the tool side end thereof with corresponding force application points.

Corresponding self-tapping blind rivets in which the tip is performed as a means for non-cutting boring by thermic softening of the workpiece by the rotation of the tip are known for example already from the WO 2004/102015 A1 or the EP 1 503 089 A1.

The closest prior art in this respect however can be learned from the DE 10 2005 035 402 A1. This publication already is showing a stir friction rivet, i.e. a self-tapping blind rivet having a mandrel the tip of which is performed as a means for non-cutting boring by thermic softening of the workpiece by means of the rotation of the tip. Here additionally further a positive fit and non-positive fit connection between the riveting mandrel and the rivet shank is provided, too.

In connection with this publication however it is provided that the mandrel of the rivet is driven rotationally. The connection between the mandrel of the rivet and the rivet shank here is serving to ensure that the rivet shank is rotating, too, to ensure that the workpieces during the insertion of the stir friction rivet laterally of the rivet, too, are maintained shapable or soft or liquid, respectively, by means of the frictional heat.

This prior art therefore diametrically is leading away from the present invention since by the necessity to drive additionally, too, the rivet shell in addition to the mandrel of the rivet to achieve a corresponding rotational motion an even larger torque has to be transferred via the mandrel of the rivet. The DE 10 2005 035 402 A1 followingly is not providing a corresponding predetermined breaking point such that here a break off of the mandrel of the rivet obviously is not provided for. In the exemplary embodiments of this publication the mandrel of the rivet rather is to remain in the blind rivet.

This construction according to this prior art followingly has the following extremely substantial disadvantage:

The torque for the drilling has to be introduced via the predetermined breaking point at which the mandrel of the rivet should break off after the blind rivet has been placed.

With rivets according to the prior art the transfer of the torque for forming the hole for placing is leading to the fact that the predetermined point of breaking is breaking prematurely especially if the rivet during the drilling of the hole for placing is slightly tilted.

For solving this problem, the present invention is proposing that a positive fit or non-positive fit is provided between the mandrel of the rivet and the rivet shank and, that a force application point for the tool is provided in or at the rivet head. In this way, the flow of the torque is by-passing the predetermined breaking point in the mandrel of the rivet since the torque up to the head of the mandrel of the blind rivet is transferred via the rivet shank.

In this connection it is especially preferred if the tip is performed as a spherical friction surface. It then is serving for the non-cutting drilling by thermic softening of the workpieces by means of the rotation of the friction surface.

It is especially advantageous if a positive fit connection is provided between the mandrel of the rivet and the rivet shank by the feature that the end of the rivet shank on the side of the workpiece is ending as saw-tooth-shaped tips and by the backside of the enlargement of the mandrel of the rivet on the end facing the rivet shank being provided with correspondingly shaped saw-tooth-shaped grooves.

Additionally and preferably it is possible to perform a positive connection between the mandrel of the rivet and the rivet shank in such a way that the mandrel of the rivet at least on the side of the workpiece with respect to the predetermined breaking point is provided with an external gearing and, that the interior side of the rivet shank is provided with a corresponding internal opposed gearing.

Further by the way a glued joint preferably can be provided to achieve the positive fit connection of the end of the rivet shank on the side of the workpiece with the mandrel of the rivet.

In this connection, it is an advantageous alternative, too, if the rivet shank at least on the workpiece side with respect to the predetermined breaking point is provided with a knurling and the rivet shank is crimped in the area of this knurling such that in this way a positive fit is provided by the means of which the rotational movement for drilling the tapping tip of the mandrel can be transferred.

Equally the back-side of the tapping tip by frictional welding or electric resistance welding can be connected with the rivet shank.

Finally a solution can be achieved in which the back-side of the tapping tip is provided with sharp cutting edges which are cutting into the rivet shank under load to achieve in this way a positive fit connection for transferring the drive forces for the tapping tip The task being basis for the present invention additionally is solved by a method for placing a blind rivet for connecting two or more workpieces, wherein the workpieces are not provided with a bore previously but instead the blind rivet itself is producing its bore by the fact that the tip of the mandrel of the blind rivet is turned and the bore in this way is produced while the blind rivet is placed, wherein the blind rivet by means of a force application point provided at the head of its shank is rotationally driven and, that the rotation forces are transferred from the shank via a positive fit or non-positive fit connection between the shank and the mandrel of the rivet to the same and from the mandrel are transferred to the tip.

In this connection it is especially preferred if the positive fit connection between the shank and the mandrel of the rivet is formed by the feature that at the end of the rivet shank on the side of the workpiece there are formed saw-tooth-shaped tips which are engaging corresponding saw-tooth-shaped grooves which are provided on the back-side of the head of the mandrel of the rivet facing the rivet shank.

Equally an especially preferred positive fit connection between the shank and the mandrel of the rivet can be provided by the feature that the mandrel of the rivet at least on the side of the workpiece with respect to the predetermined breaking point is provided with an exterior gearing and that the interior side of the rivet shank is provided with a corresponding opposed gearing The connection between the rivet shank and the mandrel of the rivet further can be provided by the feature that the rivet shank and the mandrel of the rivet in the vicinity of the end of the rivet shank facing the workpiece are glued together and in this way the driving force for the rotational movement of the tip of the mandrel of the rivet is transferred, as illustrated in FIG. 6.

Equally the mandrel of the rivet at least on the side of the workpiece with respect to the predetermined breaking point can be provided with a knurling and, wherein the rivet shank is crimped in the area of the knurling such that in this way a possibility is provided to transfer the driving force for the rotational movement of the tip of the mandrel of the rivet.

Alternatively the back-side of the hole-forming tip of the mandrel of the rivet can be connected with the rivet shank by means of frictional welding or electric resistance welding such that the driving force for the rotational movement of the tip of the mandrel of the rivet is transferred via the welded connection, as illustrated in FIG. 7.

Finally, the back-side of the tip of the mandrel of the rivet forming the hole can be provided with sharp cutting edges which by the contact forces during the self-drilling of the blind rivet are pressed into the rivet shank and in this way are transferring the drive force for the rotational movement of the tip of the mandrel of the rivet.

It has to be referred to the fact that non-cutting self-tapping screws are already known from the DE 39 09 725 C1, the DE 39 22 684 A1 and the DE 44 40 437 C1. The steps provided in these documents for drilling the placing hole in a workpiece by means of the fastener itself without the creation of chips according to the invention can be applied, too, in the present case. It is therefore here refrained from to more closely describe the corresponding shape of the tip serving for forming the hole and from describing the method for the flow forming of placing holes by means of the fastener itself.

The prejudice among experts, namely, was in the direction that via the relatively sensitive predetermined breaking point of a mandrel of the rivet no sufficient forces or torques, respectively, can be transferred to form the placing hole by means of a blind rivet itself.

BRIEF DESCRIPTION OF THE DRAWINGS

The present invention, in the following, is more closely described with reference to the exemplary embodiments shown in the drawings. In the drawings show:

FIG. 1 a self-drilling blind rivet according to the invention in a lateral view and partly in section;

FIG. 2 a self-drilling blind rivet according to the invention with a hexalobular force application point from above;

FIG. 3 a further self-drilling blind rivet according to the invention with a usual hexagon as a force application point from above;

FIG. 4a the design of the mandrel of the rivet for a further self-drilling blind rivet according to the invention;

FIG. 4b the tip of the mandrel of the rivet and the rivet shell of the blind rivet according to FIG. 4a after the assembly and mounting (crimping) and, FIG. 5 a further embodiment of a self-drilling blind rivet according to the invention in which the back-side of the tip of the mandrel of the rivet is provided with sharp cutting edges.

DETAILED DESCRIPTION OF THE DRAWINGS

Figure 6:
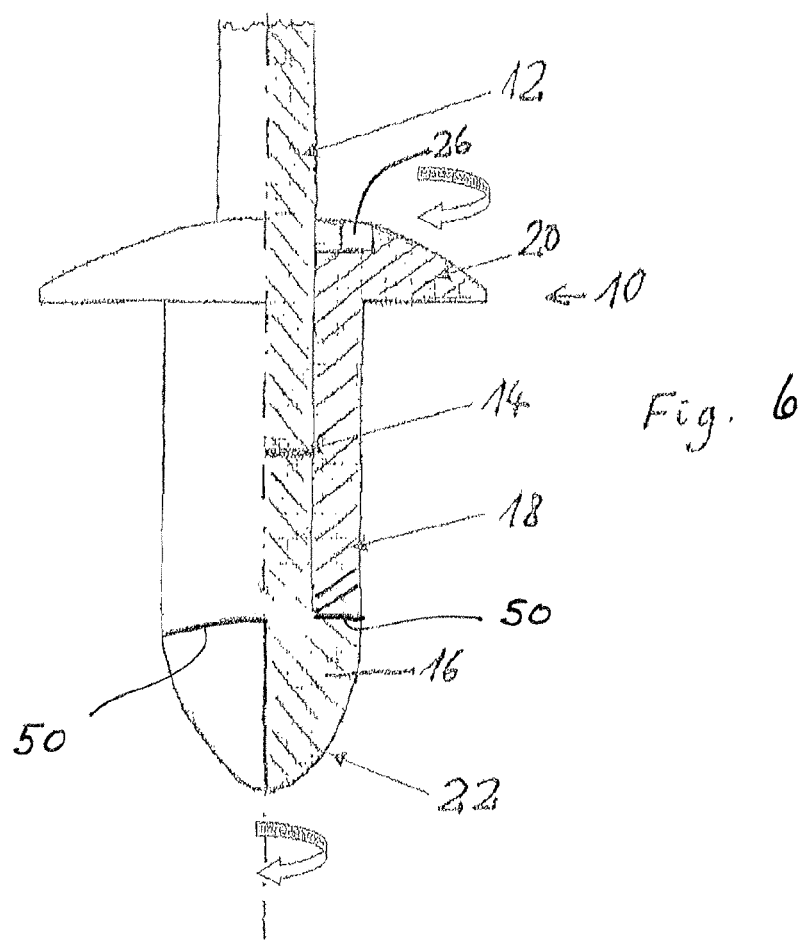
FIG. 6 is a further embodiment of a self-drilling blind rivet according to the invention in which the rivet shank and the mandrel of the rivet in the vicinity of the end of the rivet shank facing the workpiece are glued together.
Figure 7:
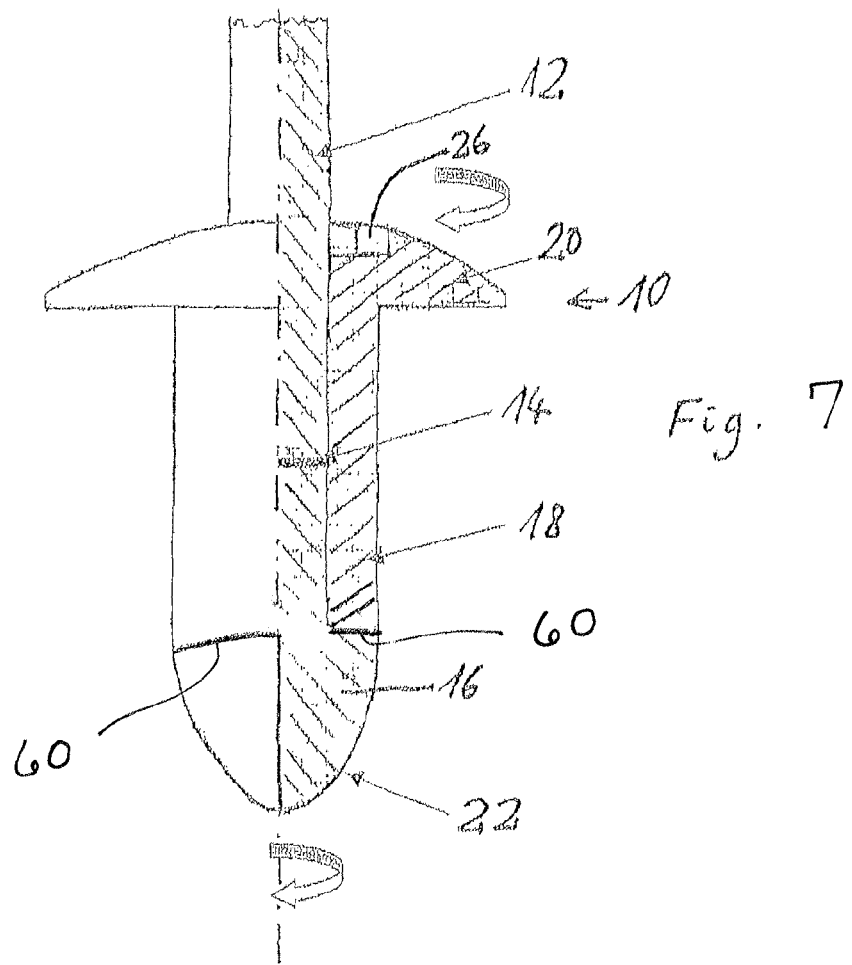
FIG. 7 is a further embodiment of a self-drilling blind rivet according to the invention in which the back-side of the hole-forming tip of the mandrel of the rivet is connected to the rivet shank by means of welding.

As shown in FIG. 1, an embodiment according to the invention is having a usual break stem blind rivet having a mandrel 12 which via a predetermined breaking point or usual break-neck 14 is merging to the enlarged head 16 of the mandrel 12. This mandrel is as usual with blind rivets enclosed by the rivet shank 18 with the rivet head 12 on the side away from the workpiece. According to the invention the head 16 of the mandrel 12 is provided with a spherically shaped tip 22 which when it is set in a sufficiently high rotations per minute is serving to the drilling of the placing hole for the blind rivet by flow shaping by means of heating the workpiece.

To transfer the corresponding rotational forces or torques, respectively, the end of the rivet shank 18 on the side of the workpiece is provided with a saw-tooth-shaped gearing 24.

The back-side of the mandrel head 16 on the side of the tool in this connection is provided with correspondingly adapted recesses for receiving the saw teeth 24 as shown.

To transfer the corresponding torques or forces, respectively, to the rivet shank 18 and from there under circumvention of the break-neck 14 to the tip 24 of the mandrel head 16 additionally an interior force application point 26 is provided within the head 20 of the blind rivet 10.

Figure 8:
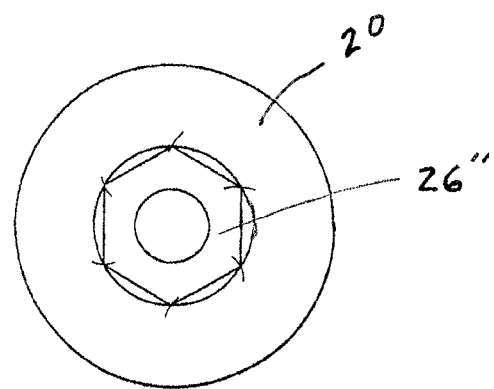
FIG. 8 is a top view of a further embodiment of a self-drilling blind rivet according to the invention with an exterior force application point.

FIG. 2 in this respect is showing a hexalobular interior force application point 26 as such force application for example is known under the trade mark Torx®. FIG. 3 in difference from the above is showing a modified embodiment in which a usual hexagonal interior (i.e. recessed) force application point 26' is provided. FIG. 8 in further difference from the above is showing a modified embodiment in which a usual hexagonal exterior (i.e. raised) force application point 26" is provided. Obviously many other force application points, too, can be used in this connection.

In this way, the rivet head and therefore the rivet shank can be set in such a strong rotation by means of a usual tool and can be pressed against the workpiece simultaneously that the spherically formed tip of the blind rivet according to the invention a surface of a workpiece by means of the heat induced by the rotation can soften the same and can penetrate into the same, wherein the corresponding placing hole is formed. Doing so, the corresponding forces or torques, respectively, according to the invention are not transferred via the break neck 14 but instead via the substantially more resistant shank 18 of the rivet which again via the gearing 24 is transferring the forces into the mandrel head 16 having the tip 22. According to the invention therefore fore substantially larger forces and torques can be transferred to the tip of the self-drilling blind rivet according to the invention without that the danger is being present that the mandrel prematurely is breaking at the break neck 14.

According to the invention naturally it is possible, too, to differently solve the transfer of forces between the rivet shank 18 and mandrel head 16, for example by a mutual gearing of mandrel 12 and shank 18, for example by alternatively provided grooves running parallel to the axis of rotation of the mandrel 12 on the exterior shelled surface of the mandrel 12 and on the interior surface of the shank 18 in the vicinity of the mandrel head 16.

Further the transfer of forces for example can be achieved by gluing the end of the shank 18 on the side of the workpiece to the mandrel head 16. In connection with this solution advantageously the use of break stem blind rivets usual until today is possible as far as these only have some kind of force application point on the shell of any kind for the turning tool for drilling.

Further possibilities for the transfer of forces between the mandrel 12 of the rivet and the shank 18 according to the invention, in the following, are more closely described with reference to the further exemplary embodiments according to the invention shown in the FIGS. 4a, 4b and 5 of the drawings.

FIG. 4a is showing a mandrel 12 which above the hole-forming tip 16 is provided with a knurling 30. This knurling 30 here is serving for the transfer of the drive forces during the drilling of the placing hole by means of the blind rivet itself.

As shown in FIG. 4b to this end the shell 18 in the region of the knurling 30 is crimped correspondingly after the insertion of the mandrel 12 of the rivet. The procedure of crimping in this connection is indicated by the arrows 32 and the created crimping pressure is shown by the reference numeral 34.

FIG. 5 is showing a further possibility according to the invention for transferring the drive forces from the shell 18 to the tip 16. Here the side 40 (back-side) of the tip 16 facing the shell 18 is provided with sharp cutting edges or ridges 42 which away from the mandrel 12 are extending radially to the exterior. By the contact pressure forces during the drilling of the self-drilling blind rivet 10 which here are symbolized by the arrow 44 the ridges 42 are cutting into the front face of the shell 18, whereby the transfer of forces for the rotational forces for the drilling of the own placing hole of the blind rivet 10 can be transferred without problem.

According to the invention the force application points 26 within or at the rivet head 20 apart from a interior force application point as shown in FIG. 1 can be performed as a separate exterior force application point, too, or can be provided by the feature that the exterior circumference of the head 20 of the shell for example is designed as a hexagon to create the force application point.

Corresponding interior force application points can be performed as an interior hexagon with the shape of crossing grooves or as a hexalobular interior force application point.

Corresponding exterior force application points can be performed as square head, hexagon head or exterior hexagon round head (hexalobular).

The present invention in this connection is suitable for all known shapes of blind rivets.

Self-evidently according to the invention instead of a spherical tip for flow forming the placing hole for the blind rivet a corresponding "classic drill tip", too, can be provided for a cutting drilling in case the occurrence of chips is not disturbing in any way.

The present invention is especially suitable for such cases in which a self-drilling screw cannot be used due to the fact that the workpieces to be joined are too thin to provide for the formation of a sufficient thread. Then the blind rivet according to the invention is the only suitable and usable solution.

Regarding the different possibilities for shaping an exclusively flow forming and non-cuttingly working tip or of a partly chips producing tip only as an example it is referred to the DE 39 09 725 C1, the DE 39 22 684 A1 and the DE 44 40 437 C1, in which the different shapes of tips and the corresponding methods for drilling with reference to screws are described in detail.

What is claimed:

1. A self-tapping blind rivet comprising:
a mandrel having a mandrel head and a mandrel shank extending from the mandrel head, wherein the mandrel shank has a break-neck portion, and the mandrel head has a generally spherical friction surface configured for non-cutting drilling by thermic softening of a workpiece by rotation of the mandrel, and
a rivet body disposed on the mandrel, the rivet body having a rivet head and a rivet shank, wherein the rivet head includes a force application point configured for rotating the rivet body about a central axis, and the rivet shank is hollow and extends from the rivet head to an end portion opposite the rivet head, and
wherein the end portion of the rivet shank is welded in a non-releasable manner to the mandrel head to transfer rotational forces from the rivet body to the mandrel between the friction surface and the break-neck portion of the mandrel shank.

2. The self-tapping blind rivet as claimed in claim 1, wherein the end portion of the rivet shank is welded to the mandrel head by a frictional weld.

3. The self-tapping blind rivet as claimed in claim 1, wherein the end portion of the rivet shank is welded to the mandrel head by an electric resistance weld.

4. The self-tapping blind rivet as claimed in claim 1, wherein the force application point comprises a hexalobular interior force application point.

5. The self-tapping blind rivet as claimed in claim 1, wherein the force application point comprises a hexalobular exterior force application point.

6. The self-tapping blind rivet as claimed in claim 1, wherein the force application point comprises a hexagonal interior force application point.

7. The self-tapping blind rivet as claimed in claim 1, wherein the force application point comprises a hexagonal exterior force application point.

8. The self-tapping blind rivet as claimed in claim 1, wherein the force application point comprises a square head exterior force application point.

* * * * *